UNITED STATES PATENT OFFICE.

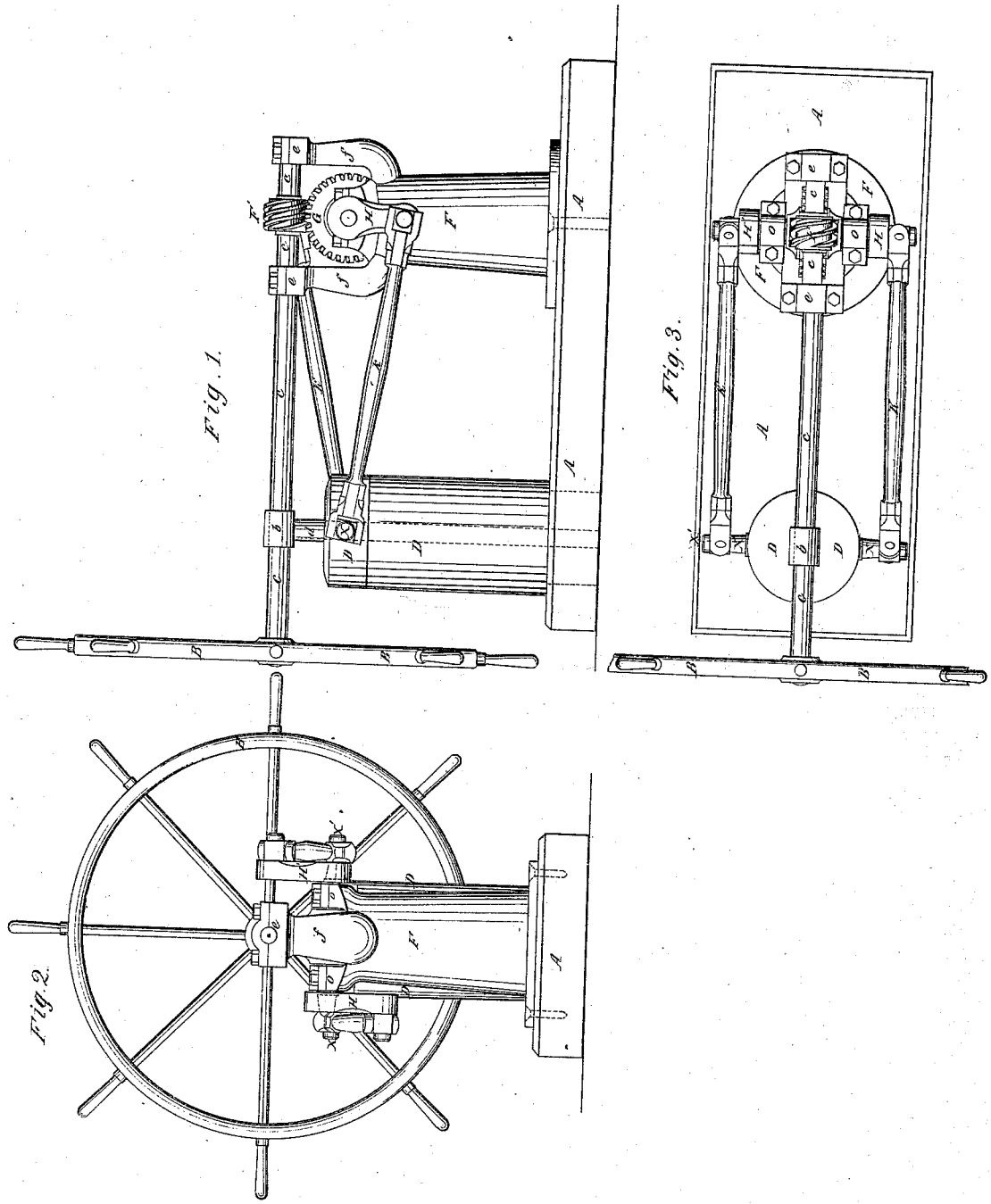

JOSEPH E. ANDREWS, OF BOSTON, MASSACHUSETTS.

STEERING APPARATUS.

Specification of Letters Patent No. 7,905, dated January 14, 1851.

*To all whom it may concern:*

Be it known that I, JOSEPH E. ANDREWS, of the city of Boston, county of Suffolk, and State of Massachusetts, have invented a new and useful Improvement in the Steering Apparatus of Ships; and I do hereby declare the following to be a full and exact description of the same, reference being had to the accompanying drawings of the same, making part of this specification.

The nature of my invention consists in transmitting the power applied through the steering wheel to the rudder by means of two cranks set in opposite directions on a shaft having fixed bearings; the said cranks being connected by connecting rods, having universal joints, to projections or arms on the rudder post; and the power being applied to the shaft upon which the cranks are fixed, by means of an endless screw on the axle of the steering wheel, gearing into a worm wheel on the shaft. This apparatus is very rigid and unyielding and at the same time works with the greatest ease and freedom and is not at all likely to get out of repair by wear or accident.

Figure 1, is a side view of my steering apparatus.

A, A, represents the deck of the vessel.

B, B, the steering wheel fixed on one end of the longitudinal shaft c, c, c. The farther end of this shaft turns in bearings e, e, and near the steering wheel it turns in a collar b, which is supported by the column d, which fits in the head of the rudder post; the bearings e, e, are formed in the shoulders f, f, of the support F which is secured to the deck.

D, D, rudder post turning on a shoulder in the floor of the deck (or otherwise constructed so as to be substantially the same) and around the column d; the lower end having the rudder hung to it in the ordinary way.

F', is a worm screw, cut on the shaft c, c, between the bearings e, e. G, is a cog wheel, with its teeth constructed for the worm F', to work in.

H H' two cranks (one only being seen in this figure) fixed one on each end of the axle of the cog wheel G, which turns on the support F.

K, K', two connecting rods one end of which being connected to the cranks, and the other to two short arms X, X', secured to the rudder post D, D, both connections being formed by universal joints.

In order to obtain strength the arms X, X', are formed of the projecting ends of a strong bar fixed in and through the rudder post. The arm X, only, is shown in this drawing, the other X', is seen on the plan.

The operation of this apparatus is as follows. By turning the steering wheel, the screw on the end of the shaft c, c, c, moves the cog wheel G, the axle of which turns the cranks that are fixed to it. These cranks being fixed by universal joints to the connecting rods give the latter an alternate and reciprocating motion and the ends of the connecting rods being attached to the short arms X, by universal joints move the rudder post, and consequently the rudder which is attached to it through the entire range which is needed for steering purposes.

Fig. 2, is an end view of my steering apparatus, the lettering of the parts corresponding with those on Fig. 1. In this drawing the two cranks H, H', are shown and the bearings o, o', for the axle of the cog wheel G.

Fig. 3, is a plan of my invention showing the general arrangement of the apparatus; the letters to each part being the same as in Figs. 1 and 2.

What I claim as new in my invention and desire to secure by Letters Patent, is—

The combination of the cranks H, H, and the connecting rods K, K', which are attached by universal joints to the projections or arms X, X, on the rudder post, the cranks having a worm wheel G, on their shaft or axis, which gears with and is actuated by an endless screw F, on the axle or shaft of the steering wheel, the whole of the parts being arranged in the manner substantially as described.

JOS. E. ANDREWS.

Witnesses:
 FRANCIS A. LOVIS,
 THOS. B. HAWKES.